May 2, 1950     S. P. MORSE     2,506,312
MOTOR SPEED AND CIRCUIT GOVERNOR
Filed Nov. 8, 1945     4 Sheets-Sheet 1

INVENTOR.
Shirley P. Morse,
BY
ATTORNEY

May 2, 1950   S. P. MORSE   2,506,312
MOTOR SPEED AND CIRCUIT GOVERNOR
Filed Nov. 8, 1945   4 Sheets-Sheet 2
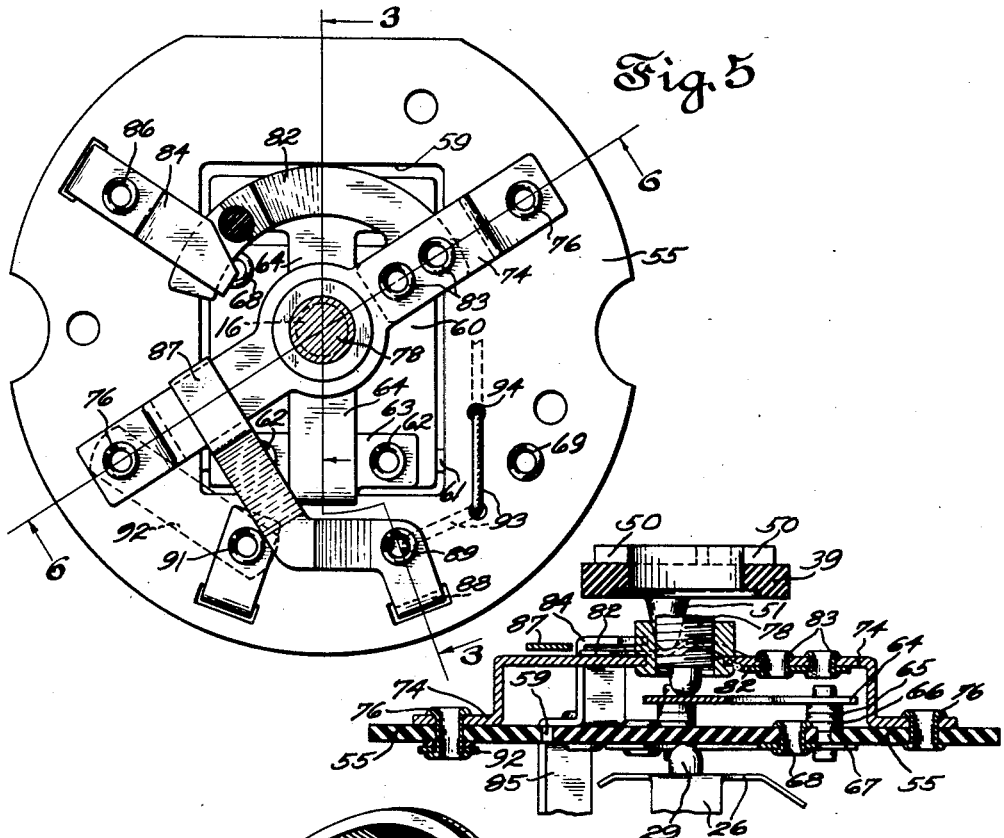
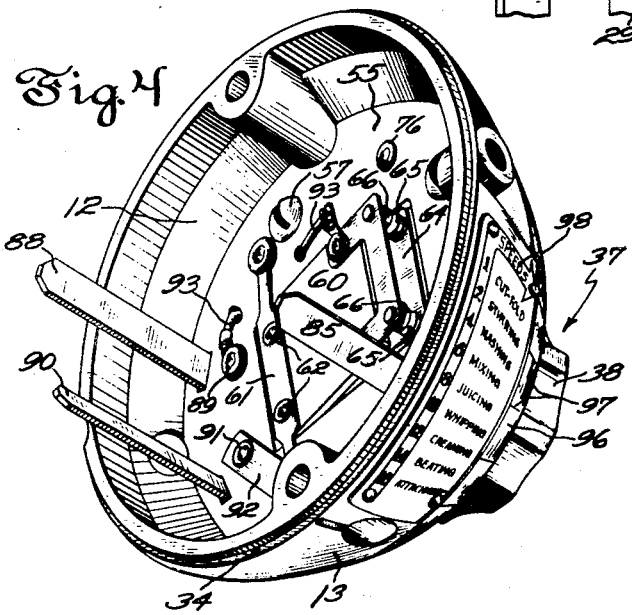
INVENTOR.
Shirley P. Morse,
BY
ATTORNEY.

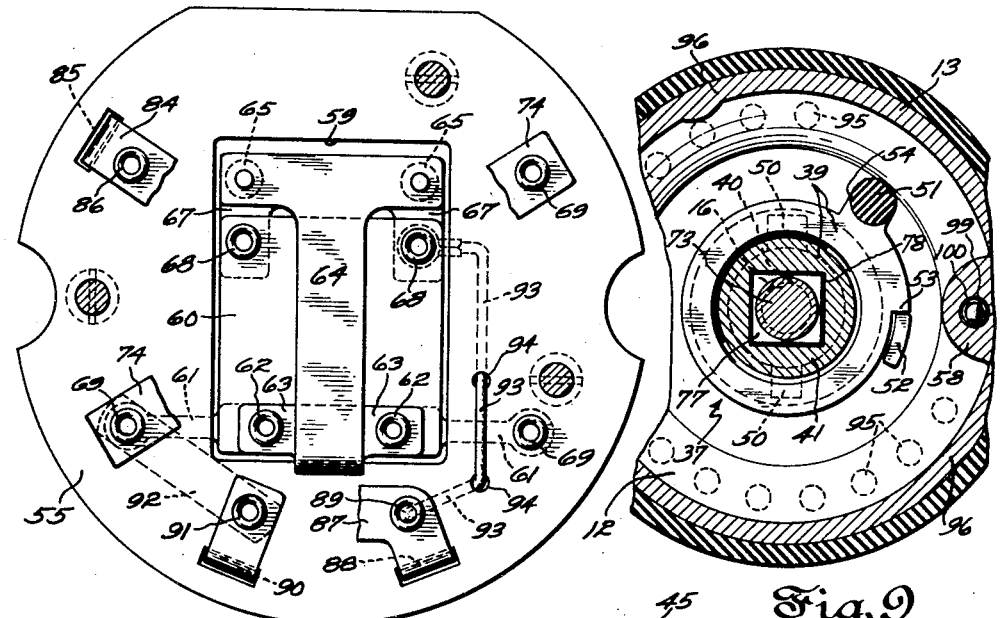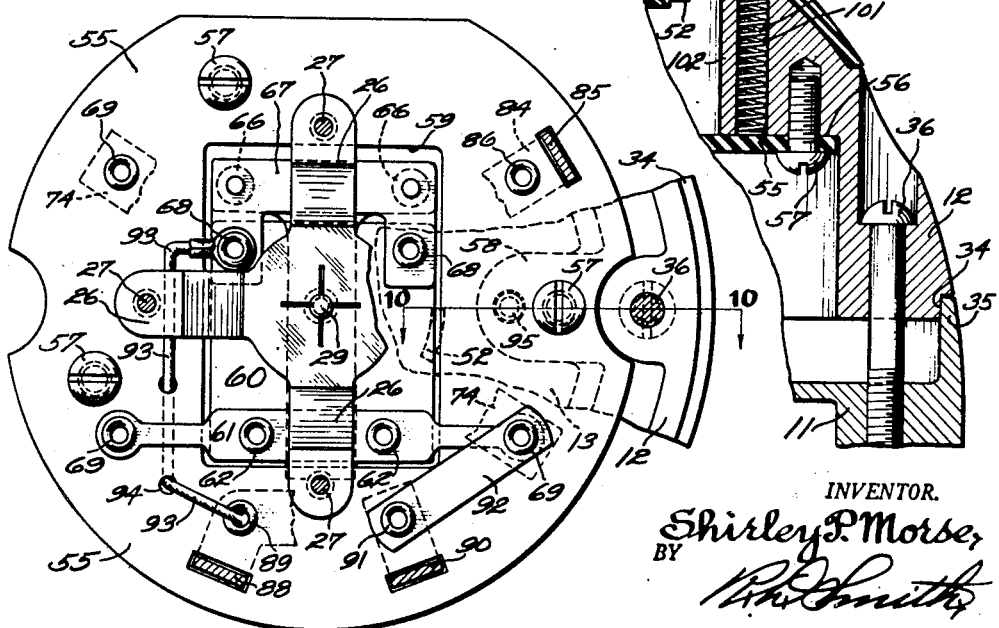

May 2, 1950 S. P. MORSE 2,506,312
MOTOR SPEED AND CIRCUIT GOVERNOR
Filed Nov. 8, 1945 4 Sheets-Sheet 4

INVENTOR.
Shirley P. Morse,
BY
ATTORNEY

Patented May 2, 1950

2,506,312

UNITED STATES PATENT OFFICE 2,506,312

MOTOR SPEED AND CIRCUIT GOVERNOR

Shirley P. Morse, East Haven, Conn., assignor to The A. C. Gilbert Company, New Haven, Conn., a corporation of Maryland Application November 8, 1945, Serial No. 627,479

16 Claims. (Cl. 318—301)

This invention relates to centrifugally responsive manually settable circuit controllers for starting, stopping and/or regulating the speed of running of an electric motor and relates particularly to circuit controlling mechanisms suited to share with the motor the interior space of the torpedo-shaped casing of an electrically powered kitchen food mixer.

It is advantageous in this kind of electrically powered appliance to locate a manual rotary circuit controller for starting, stopping and determining the speed of the motor at the rear end of the motor housing opposite that end which carries the motor driven working tool or food agitator. Since it is desirable also to provide the motor housing with a tapering and rounded rear end, peculiar restrictions are imposed upon the space that is available in such housing for circuit governing mechanism located at the end of the motor shaft.

The present improvements concern construction and disposition of such electric circuit governing mechanism having as one aim a more advantageous use of the above mentioned available housing space and as another aim increased simplicity and ruggedness of such mechanisms wherever used yielding greater economy in their manufacture and rendering them more dependable in performance as well as permitting easier servicing, repair and adjustment in the subject type of appliance.

One object of this invention is to enable a single speed setting rotary controller handle to serve to stop and start the motor as well as to determine the motor speed without complicating the structure of the handle turned controller with space consuming cam surfaces.

A further object is to provide means for calibrating a motor speed regulator by instrumentalities requiring a minimum of manipulation or disassemblage of appliance parts for setting the speed indication into true conformity with a test performance of the actually maintained motor speed.

A further object is to save axial space by interposing between the end of the motor shaft and the speed setting controller a novel arrangement of contact carrying flaps that are wavable toward and away from each other as well as relative to the motor shaft.

A further object is to equip the above mentioned flaps with cooperative circuit making and breaking contacts in such arrangement that one of the flaps facing the motor shaft may be oscillated broadside in proportion to changes in motor speed by the simplest of centrifugal devices carried on the motor shaft, while the other contact equipped flap may face the speed setting controller and be adjusted broadside thereby to different selected positions for determining what motor speed shall automatically be maintained through action of the centrifugal device.

A particular object is to utilize a speed setting handle coupled operatively like a wrench to the interior electric contact positioning parts which it actuates, thus to be freely separable from such parts.

A further object is to organize the aforementioned electric circuit governing mechanism, together with a separable end section of the appliance casing which supports it, into an integrated structure which may be applied and removed as a unit from the motor and from the remainder of the appliance casing in which the motor is housed.

A further object is to utilize the aforesaid single speed setting controller handle, which also serves to start and stop the motor, to serve also to short circuit the aforesaid flap-carried speed regulating contacts and thereby relieve the latter from having to carry the heavy current load drawn by the motor when heavily loaded, such as when coupled to drive food processing accessories for extracting fruit juices, grinding meat, cracking ice, seeding raisins, etc.

A further object is to organize all of the electric contact carrying parts into a unitary subassemblage which may be removed as such from the above mentioned controller structure.

A still further object is to make use of screw means for effecting speed calibrating adjustment and also to make use of the same screw means for fastening axially together interior and exterior sections of a speed setting manual controller.

These and related objects of the improvements will appear in greater particular in the following description of a successful embodiment of the invention which has reference to the appended drawings. In the drawings arrows applied to section planes indicate the direction in which the subject is viewed in those figures of the drawings whose numbers correspond to the numbers applied to the arrows.

Fig. 4 is a perspective view of the speed setting unit separated from the motor section of the appliance.

Fig. 5 shows the rear face of the subassemblage of circuit making and breaking contacts removed from the unit of Fig. 4 and viewed from the plane 5—5 in Fig. 3.

Fig. 6 is a view taken in section on the plane 6—6 in Fig. 5.

Fig. 7 shows the switch base plate viewed as in Fig. 5 with the starting and stopping contacts partially broken away to expose the speed regulating contact carrying flap.

Fig. 8 shows the opposite or front face of the subassemblage of Fig. 5 as viewed from the plane 8—8 in Fig. 3.

Fig. 9 is a fragmentary view taken in section on the plane 9—9 in Fig. 3 showing swivel limiting stops for the speed setting handle.

Fig. 10 is a fragmentary view taken in section on the plane 10—10 in Fig. 8 showing a positioning detent for the speed setting handle.

Figure 1:
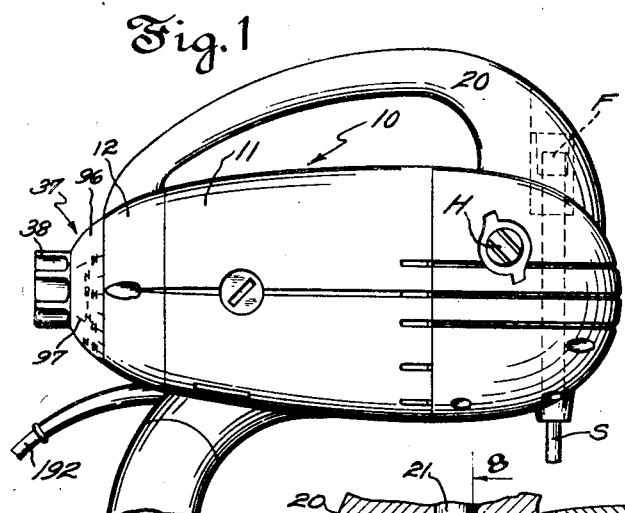
Fig. 1 is a side view of an electrically powered kitchen food mixing appliance in which is incorporated a manually settable motor circuit governing mechanism embodying the present improvements.

The motor circuit governor of these improvements is particularly adapted for installation in the rear end of a household food mixing appliance such as that shown in Fig. 1 whose motor and external instrumentalities are more completely shown in United States Patent No. 2,292,566, granted August 11, 1942. The torpedo shaped casing or housing structure of the appliance is indicated as a whole at 10 and for purposes of the present invention is divided into a main, motor surrounding section 11 and a rounded end section 12. As in Figs. 7, 8 and 9 of the aforesaid patent, the main casing section 11 may support the spindle or spindles S of conventional food agitators not shown, as well as a lateral power socket H into which a top power socket F into which can be inserted the tenoned shaft of a food processing accessory such as a fruit juicer, meat grinder, ice cracker, raisin seeder or the like. This main casing section 11 also contains power transmission and chuck devices that couple the motor drivingly to such spindle, spindles, or accessory shafts as are fully set forth in the said patent.

Figure 3:
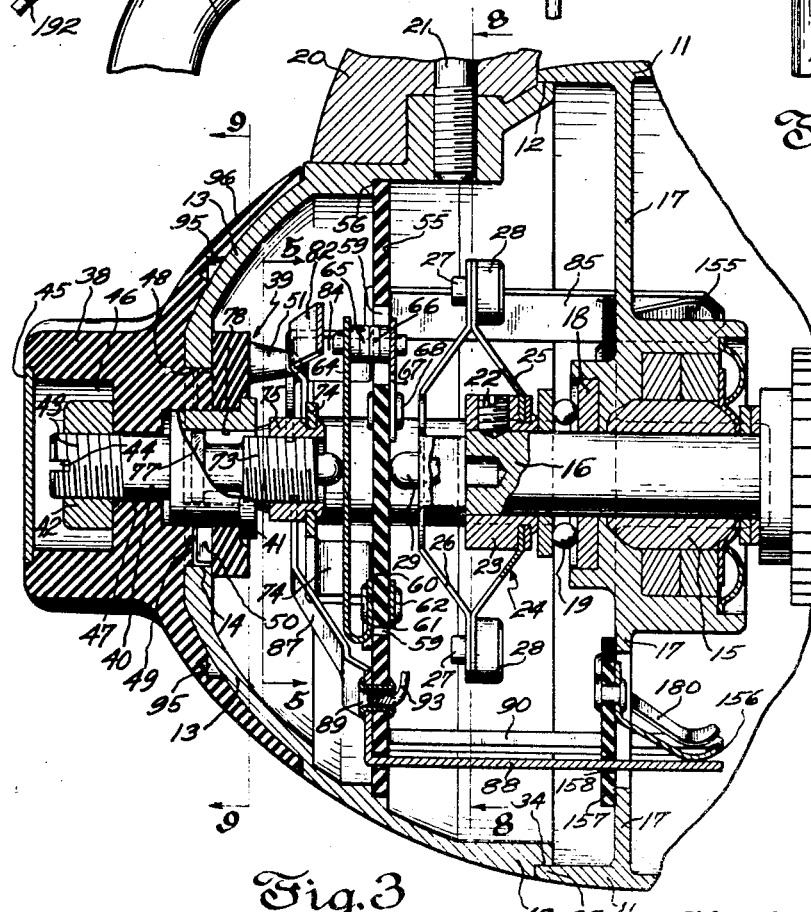
Fig. 3 is a view drawn on an enlarged scale taken in section through the motor speed governing mechanism on the plane 3—3 in Figs. 2 and 5.

In the main housing section a rotor bearing 15 for a motor armature and its shaft 16 is lodged in a housing partition wall 17, as is also a thrust washer 18 for the axial thrust ball bearing 19. There is fastened on the end of shaft 16 by set screw 22 the hub 23 of a centrifugal speed regulator indicated as a whole by 24. This automatic regulator as indicated in Figs. 3 and 8 may be of conventional construction and comprises two oppositely bowed spiders 25 and 26 each having four limber resilient radial arms, alike, joined together at their outer ends by fastenings 27 which also secure to said arms the centrifugal weights 28. The spider 25 nearest the motor is fixed on hub 23. The other or outer spider 26 carries coaxially with shaft 16 a pressor button 29 which moves closer to the end of the shaft as increasing rotary speed of the motor shaft and regulator brings centrifugal forces to play upon the weights 28.

The rounded end section 12 of the appliance housing structure is provided with a circumferential rabbet 34 which fittingly engages an annular terminal lip 35 on the main housing section 11 and is removably held in place fixedly by one or more screws such as 36. If desired the appliance handle 20 may also be fastened to section 12 by a bolt 21. Thus end section 12 together with its entire carried speed governing switch mechanism is integrated in the form of a unit shown detached from the main housing section 11 and from handle 20 in Fig. 4.

Figure 11:
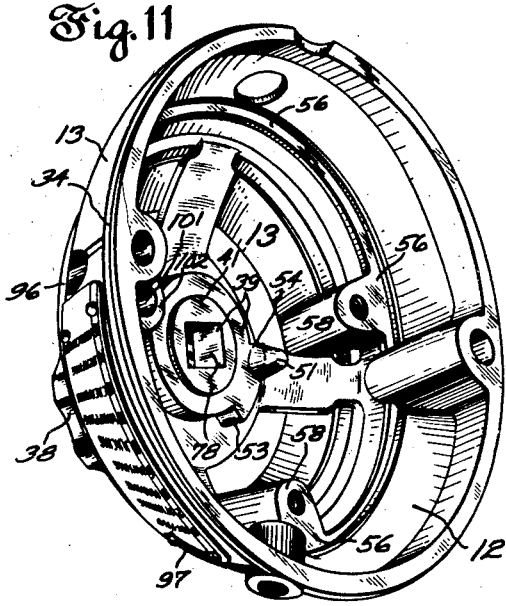
Fig. 11 shows the empty interior of the speed setting unit of Fig. 4 with its subassemblage of circuit making and breaking contacts of Figs. 5, 7 and 8 removed.

Referring to Figs. 3, 4 and 11 the rotary, speed setting controller, designated 37 as a whole, is shown to comprise a handle knob 38 outside the end housing section 12 and an actuator 39 inside of this housing section including a crank post 51 and a wrench-like socket 78. Actuator 39 is operably joined to handle 38 by a tie bolt 40 which may contain the socket 78 and whose head flange 41 draws the actuator 39 tightly against a hub 48 portion of handle 38 when nut 42 is tightened. Nut 42 is on the threaded end 43 of tie bolt 40 which has a screw driver slot 44 and is concealed in a central recess 46 in handle 38 covered by a removable snap plate 45 which can be forced into and pried out of a shallow counterbore around this recess. Tie bolt 40 extends with freely sliding clearance through a hole 47 in handle 38.

Hub 48 of handle 38 is thus journaled to turn freely in a central bearing hole 14 through the dome shaped wall 13 of end section 12 and is retained axially in place by the actuator 39 which is of large enough compass to overlap the inside of wall 13. Handle hub 48 is grooved diametrically at 49 and fittingly receives at least one key lug 50 fixedly carried by actuator 39 so that the actuator always turns in unison with handle 38. The extent of rotary movement of controller 37 is limited to less than a complete turn by a stationary stop abutment 52 projecting from the inner surface of wall 13 which encounters the turn limiting shoulders 53 and 54 on actuator 39. Crank post 51, and if desired other portions of actuator 39, will preferably be made of insulating material.

A group of current conductive parts, including broadside wavable flaps carrying circuit making and breaking terminals or contacts that are movable jointly by the centrifugal regulator 24 and by the speed setting manual controller 37, are disposed between and transverse the axis of such regulator and controller. These parts are all carried as a unit on a switch base plate 55 which is preferably of insulating material. Base plate 55 is removably fastened against an annular shoulder 56 formed internally on the removable end housing section 12 by screws 57 which engage with threaded holes in bosses 58 cast integrally with the wall of this housing section. A rectangular aperture 59 is cut in base plate 55 and is occupied by a marginal portion of a stiff card flap 60 of insulating material swingably supported at one of its edges by a narrow thin twistable hinge strip 61 fastened to card 60 by eyelets 62 so that the card flap is wavable to and away from flush relation to the base plate. These eyelets are electrically conductive and also serve to clamp against the reverse face of card 60 the mounting flange 63 of a limber resilient U-shaped conductive flap 64 carrying at its opposite or free widened end two speed governing circuit terminal contacts 65 alike in polarity. Opposed respectively to contacts 65 are two contacts 66 alike in polarity but of different polarity from that of contacts 65. Contacts 66 are carried by a rigid conductive bridge strip 67 firmly fixed to card 60 by eyelets 68. The resilient flap 64 is normally so sprung as to tend to separate contacts 65 from contacts 66, but hinge strip 61 serves merely as a current conductor and simple form of pivotal anchorage for the card flap 60, exerting preferably little or no bias on the latter in either direction of the latter's useful small range of swinging movement. Eyelets 69 fix 61 to 55.

According to the present improvements the switch base plate 55 also carries bearing support for a speed setting adjuster 73, such support being stationed on the end section 12 of the housing structure independently of and apart from the controller 37. The speed setting adjuster 73 is thus located between motor shaft 16 and the said manual controller in axial alignment with both of them. Specifically in the form herein illustrated, the bearing support includes a stiff bracket 74 of conductive material in which is fixed in coaxial relation to the motor shaft an internally threaded bushing 75. Bracket 74 is fastened to the switch base plate 55 by eyelets 76. The aforementioned adjuster 73 takes the form of a screw adjustably turnable in threaded engagement with bushing 75 and having a flat sided head 77 slidably fitting a flat sided socket 78 formed in the end of actuator 39. Thus adjuster 73 is operably related to the controller 37 while the latter remains freely separable from the former for permitting all of the parts carried by switch base 55 to be removed from the housing section 12 without disturbing the assemblage of controller 37 with this housing section.

We now come to the motor starting and stopping switch contacts carried by base plate 55 in position to be actuated by the crank post 51 of the actuator 39 of the manual controller 37. These include a spring leaf conductor arm 82 having one end fixedly anchored at its base end on bracket 74 by means of eyelets 83 and adapted at its free end to make and break contact with the overhanging shelf-like end of a stiff bent strip terminal 84 which is fixedly stationed on the base plate 55 by a through eyelet 86 and is elongated to extend through a closely fitting slot in the base plate and projects from the opposite face thereof to serve as a connector prong 85. Another spring leaf conductive arm 87 and another elongated connector prong 88 are conductively joined and fixed on base plate 55 by a through eyelet 89, prong 88 extending through a closely fitting slot in base plate 55 and parallel to prong 85. The free end of the spring leaf arm 87 overlies and makes and breaks contact with the bracket 74. There is a third connector prong 90 similarly fixed on the base plate 55 by an eyelet 91 and extending through a closely fitting plate slot. Eyelet 91 also clamps a conductive bus strap 92 against the mounted end of prong 90 which carries current to the aforementioned hinge strip 61 of the card flap 60. It has heretofore been mentioned that hinge strip 61 is in permanent electrical connection with the conductive contact carrying flap 64 through eyelets 62.

A flexible lead wire 93 electrically connects the conductive bridge strip 67 on card flap 60 with eyelet 89 that fastens prong 88 to base plate 55 and without appreciably impeding free swinging movement of the card flap. The lead wire 93 passes from one face of base plate 55 to the other through holes 94 which enable wire 93 to cross the hinge strip 61 at a point where it is mechanically and electrically separated therefrom.

Fig. 9 shows a circular series of sunken spots 95 on the inner concave face of handle skirt 96 whose outer convex face is marked with speed indicating indicia 97 turnable into selective register with the index arrow 98 carried on the stationary wall 13 of housing section 12. A detent ball 99 is pressed by spring 100 into the circular path traversed by sunken spots 95 as the knob handle 38 is turned and serves to yieldably retain the handle in any of its several set rotary speed selecting positions. Spring 100 is free to expand axially in a bore 101 in boss 102 formed on the interior of housing section 12. The rear end of bore 101 faces the switch base plate 55 so that the latter retains the spring 100 in this bore and serves as removable thrust abutment for the spring.

Figure 14:
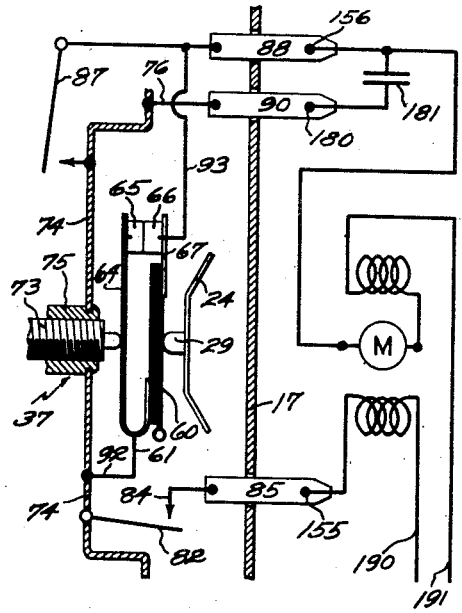
Fig. 14 is a schematic diagram of electric circuits and wiring connections embodying one form of improved electrical systems made possible by the structures illustrated in the remaining figures of the drawings.
Figure 12:
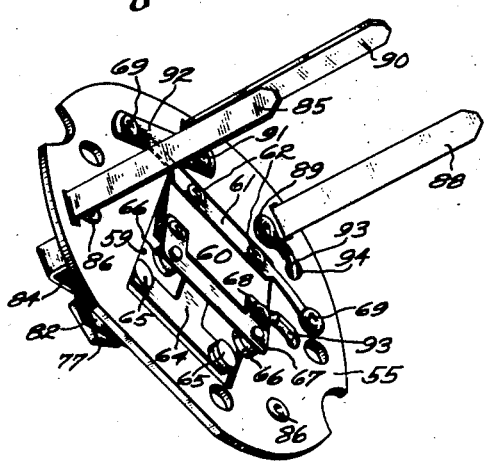
Fig. 12 is a perspective view of the front face of the subassemblage shown in Fig. 8 removed from the structure of Fig. 11.
Figure 13:
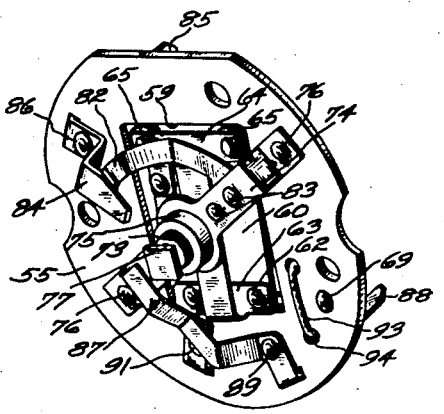
Fig. 13 is a perspective view of the rear face of the same subassemblage shown in Fig. 5 removed from the structure of Fig. 11.

In applying and removing the speed governing unit of Fig. 4 from the main body of the appliance, the free ends of the before described conductive prongs 85 and 88 wipe into or out of conductive engagement with spring clip circuit terminals 155 and 156, respectively, which connect electrically to the two sides of the motor. The third prong 90 in like manner wipes into and out of conductive engagement with a third spring clip circuit terminal 180 which connects electrically with a condenser 181 arranged in shunt relation to speed regulating contacts 65 and 66 for reducing sparking thereat. As indicated in Figs. 3 and 14 each of the three spring clip circuit terminals 155, 156 and 180 is mounted on an insulative supporting plate 157 that may be fixed on the partition wall 17 of the main section of the appliance housing. The plates 157 as well as wall 17 have registering apertures 158 to admit the prongs 85, 88 and 90 as the latter are thrust forward in joining the unit of Fig. 4 to the main body of the appliance.

With particular reference to Fig. 14, in conjunction with other figures of the drawings, the operation will be described by starting with the speed setting handle 38 positioned as in Fig. 2 where the indicium "Off" registers with index arrow 98. At this time the shoulder 53 of the actuator 39 is at rest against the stationary stop lug 52 on the housing which permits only clockwise turning of the handle from its position in Fig. 2. Also in this "Off" position the crank post 51 bears against spring leaf arm 82 and holds the latter's free end separated from bent strip terminal 84, arm 82 being so sprung as normally to tend to contact with terminal 84.

While there are many possible circuit arrangements that will cause making and breaking of contact between 82 and 84 to start and stop the motor, Fig. 14 diagrams an electrical system in which current is fed to an appliance through two wires 190, 191 of a flexible attachment cord 192 shown in Fig. 1. Wire 190 leads to one field winding of the motor whose opposite end connects to a spring clip 155. The other wire 191 leads to the other field winding of the motor and thence through the motor brushes and armature M to the spring clip 156 and also to the condenser 181 whose other side is connected to spring clip 180. Thus it will be seen that in the above described starting position of the parts all current from wire 190 is dead-ended at 84.

Figure 2:
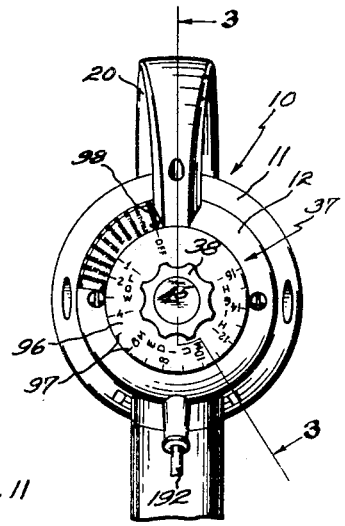
Fig. 2 is a view looking from the left in Fig. 1 at the rear end of the appliance showing the motor speed setting handle and speed indicating indicia.

When handle 38 is turned clockwise in Fig. 2, crank post 51 swings clear of the spring leaf arm 82 permitting the latter to engage conductively the bent strip 84 which will complete a circuit through 190—motor field winding—155—85—

84—82—74—92—81—64—65—66—67—93 — 88—156—motor field winding—191. Current can not at this time pass through prong 90 because circuit through the latter is dead-ended at condenser 181. The motor will now start and speed up until centrifugal force acting on regulator 26 draws the presser button 29 toward the right. Follow-up of card flap 60 is occasioned by the spring tension in flap 64 which always tends to separate speed regulating contacts 65, 66 and finally is able to do so when the motor has attained the speed for which the adjuster 73 has been set by handle 38. Upon this automatic separation of contacts 65, 66, the above said circuit through the motor will become broken and as the motor loses speed presser button 29 will move toward the left and ultimately re-make the motor circuit through contacts 65, 66. Thus alternate deenergizing and reenergizing of the motor will keep it at a constant set speed irrespective of variations in the mechanical load which it is called upon to drive. As the adjuster 73 is moved toward the right in Figs. 3 and 14 by clockwise turning of handle 38 in Fig. 2, a higher and higher speed of the motor will be required to draw presser button 29 far enough to the right to separate contact 66 from contact 65 as is well understood in this art.

The present circuit governing mechanism incorporates a new and valuable feature in the ability to relieve the automatic speed regulating contacts 65, 66 of carrying the heavier current drawn by the motor when it is loaded with relatively heavy duty accessory appliances such as fruit juices, meat choppers, etc. This is accomplished by providing an additional circuit from the prong 88 through the spring leaf conductive arm 87 to the bracket 74. This circuit is made when arm 87 is thrust into conductive contact with bracket 74 in the extreme rotary position of crank post 51 occasioned by turning handle 38 clockwise as far as it will go in Fig. 2. On this occasion limit shoulder 54 on actuator 39 brings up against the stop 52 and in this position, crank post 51 rides onto the sloping free end portion of spring arm 87 forcing the latter conductively against bracket 74. This short circuits the regular contacts 65, 66 so that these contacts are relieved of carrying heavy load currents for long periods of time. The circuit by which the motor is now energized becomes, 190—field winding—155—85—84—82—74—87—88—156—motor brush and armature—motor field winding—191. As soon as handle 38 is turned backward, or counterclockwise, contact breaks between 74 and 87 restoring the automatic control of the motor speed to contacts 65 and 66.

Many different arrangements of electric circuits incorporating a power motor, and if desired various electrical units for introducing into such circuits fixed or variable electrical capacitance, inductance, resistance or transformer effects, will suggest themselves to those skilled in this art, wherefore the appended claims are directed to and intended to cover all variations in electrical system as well as all obvious substitutes for the herein illustrated mechanical parts and arrangements that fairly come within the language of the claims.

Certain combinations of elements and features of the invention disclosed herein are claimed in my copending application divisional herefrom, Serial No. 15,616, filed March 18, 1948.

I claim:

1. In a governor for motor circuits in an electrical appliance, the combination with an appliance housing of, a motor shaft, a centrifugal speed regulator arranged on said shaft to perform movement axially thereof responsive to changes in rotary speed, a speed setting controller rotatably supported in an end portion of said housing and turnable coaxially of said shaft comprising a handle outside of said housing and an actuator inside of said housing portion operably connected to said handle, a speed adjuster operably related to said actuator located between the same and said motor shaft, bearing support for said adjuster stationed on said housing structurally apart from said controller, and cooperative circuit making and breaking members electrically operative to govern the motor speed constructed and arranged to be moved relatively by said centrifugal regulator and by said speed adjuster.

2. In a governor for motor circuits in an electrical appliance, the combination defined in claim 1, in which the said speed adjuster is journaled for rotary movement in the said bearing support.

3. In a governor for motor circuits in an electrical appliance, the combination defined in claim 1, in which the said bearing support contains a threaded hole in coaxial alignment with the said motor shaft and the said speed adjuster comprises a screw threaded member rotatably supported in said threaded hole.

4. In a governor for motor circuits in an electrical appliance, the combination defined in claim 1, in which the said handle and the said actuator have axially abutting faces, together with a tie bolt shaped and arranged to hold said actuator and said handle tightly together, said tie bolt being aligned axially with said shaft and extending through said handle to be accessible outside of the said housing structure.

5. In a governor for motor circuits in an electrical appliance, the combination defined in claim 1, in which the said bearing support contains a threaded hole, and the said speed adjuster comprises a screw threaded member rotatably supported in said threaded hole in coaxial alignment with the said motor shaft, and the said actuator is rotatably coupled to said speed adjuster in a manner permitting free axial separation of the former from the latter.

6. In a governor for motor circuits in an electrical appliance, the combination defined in claim 1, in which the said bearing support contains a threaded hole, and the said speed adjuster comprises a screw threaded member rotatably supported in said threaded hole in coaxial alignment with the said motor shaft, said adjuster and said actuator being cooperatively shaped to fit separably together in rotary interlocked relation.

7. In a governor for motor circuits in an electrical appliance, the combination defined in claim 1, in which the said bearing support contains a threaded hole, and the said speed adjuster comprises a rotatable screw with a flat sided head supported in said threaded hole in coaxial alignment with the said motor shaft, the said actuator having a flat sided socket receptive to said screw head with a rotary impelling fit.

8. In a governor for motor circuits in an electrical appliance, the combination defined in claim 1, in which the said handle and the said actuator have abutting shoulders, together with a tie bolt holding said shoulders firmly together, and the said bearing support contains a threaded hole, and the said adjuster comprises a screw rotatably supported in said threaded hole, together with means impellably coupling said actuator in separable relation to said adjuster comprising a flat sided head on said screw and a flat sided socket in said actuator.

9. In a governor for motor circuits in an electrical appliance, the combination defined in claim 1, in which the said handle contains a central clearance hole, and both the said actuator and said handle have mutually abutting faces, said actuator further having a thrust affording face overlapping the inside of the said housing structure, together with a tie bolt extending through said clearance hole having a threaded end outside of the latter, and a retaining nut on said threaded bolt end adapted to clamp said abutting faces firmly together in the presence of swivel permitting axial clearance between said housing structure and said overlapping thrust face of the actuator.

10. In an electrical appliance having a motor enclosed by an appliance housing, a motor circuit governing electric switch unit comprising in combination, a cupped end section of the appliance housing detachably mountable on the appliance, current switching mechanism located inside of said detachable housing section, a manual controller for operating said mechanism joined in freely separable relation thereto and carried by said detachable housing section in a manner to be accessible outside the latter, and a base carrying said current switching mechanism detachably mounted in said cupped housing section to be removable in unison with said current switching mechanism therefrom.

11. In an electrical appliance having a motor enclosed by an appliance housing, a motor governing electric switch unit as defined in claim 10, in which the said current switching mechanism comprises circuit making and breaking contacts carried on the opposite side of the said base from the appliance motor, together with current conductive prongs carried on said base and elongated toward the motor of the appliance for making breakable circuit connections between the latter and said switching mechanism.

12. In an electrical appliance having a motor enclosed by an appliance housing, a motor governing electric switch unit as defined in claim 10, in which the said base comprises an insulative plate containing a central aperture, and the said current switching mechanism includes a circuit making and breaking contact, together with a flap carrying said contact hinged on said base in position to occupy said aperture and to swing into and out of substantially planar alignment with said plate.

13. In an electrical appliance having a motor enclosed by an appliance housing, a motor governing electric switch unit as defined in claim 10, in which the said base comprises a plate containing an aperture and having a planar surface, and the said current switching mechanism comprises a circuit terminal mounted on said base plate, a contact movable into and out of conductive engagement with said terminal, a stiff card-like flap having a flat broadside face carrying said contact, and a hinge device swingably coupling a marginal portion of said flap to said base plate at one edge of said aperture in such position that said marginal flap portion occupies said aperture while said broadside face of the flap is wavable toward and away from substantially coplanar alignment with said planar surface of the base plate.

14. In an electrical appliance having a motor enclosed by an appliance housing, a motor governing electric switch unit as defined in claim 10, in which the said base comprises a plate, and the said current switching mechanism comprises a circuit terminal, a contact movable into and out of conductive engagement with said terminal, a stiff card-like flap carrying said contact, and a hinge device swingably coupling said flap to said base plate comprising an elongated straight thin narrow strip of twistable material secured to said base plate at opposite ends of the longitudinal axis of said strip and having an intermediate portion of its length paralleling a marginal portion of said flap and secured thereto, whereby said strip functions as a hinge device by twisting along its said axis.

15. In an electrical appliance having a motor enclosed by an appliance housing, a motor governing electric switch unit as defined in claim 10, in which the said base comprises a plate, and the said current switching mechanism comprises a foldable flap comprising two thin leaf-like arms facing each other broadside, at least one of said arms being resilient and tensioned to resist relative closing movement of the arms, cooperative circuit making and breaking contacts carried respectively by said arms in position to engage and separate when said arms are respectively closed and opened, a stationary abutment adjustable by the said manual controller to variable positions for limiting opening movement of one of said arms, and a circuit regulator constructed and arranged to urge the other of said arms in arm closing direction toward said stationary abutment against the tension in said resilient arm.

16. In an electrical appliance having a motor enclosed by an appliance housing, a motor governing electric switch unit as defined in claim 10, in which the said base comprises a plate, and the said current switching mechanism comprises two contacts movable into and out of conductive engagement, a stiff card-like flap of insulative material carrying one of said contacts, a bowed leaf of resilient conductive metal attached to said flap and carrying the other of said contacts, a flexible current conductor trailing said flap carried contact, and a straight thin narrow strip of twistable conductive material electrically connected to said resilient leaf having its opposite ends secured to said base plate, an intermediate portion of the length of said strip being secured to said flap thereby to enable said strip to conduct current to said resilient leaf while swingably coupling said flap to said base.

SHIRLEY P. MORSE.

REFERENCES CITED

The following references are of record in the file of this patent:

UNITED STATES PATENTS

| Number | Name | Date |
|---|---|---|
| 1,594,841 | Klein | Aug. 3, 1926 |
| 1,852,817 | Merrill | Apr. 5, 1932 |
| 1,949,806 | Miller | Mar. 6, 1934 |
| 1,964,581 | Janca, Jr. | June 26, 1934 |
| 2,083,343 | Naul | June 8, 1937 |
| 2,092,955 | Chamberlain | Sept. 14, 1937 |
| 2,106,058 | Nielsen | Jan. 18, 1938 |
| 2,162,237 | Avery | June 13, 1939 |
| 2,165,858 | Jepson | July 11, 1939 |
| 2,213,191 | Johnston | Sept. 3, 1940 |
| 2,274,480 | Jepson | Feb. 24, 1942 |